US009760960B2

(12) United States Patent
Laine et al.

(10) Patent No.: US 9,760,960 B2
(45) Date of Patent: Sep. 12, 2017

(54) AUTOMATICALLY MODIFYING ELECTRONIC AGREEMENTS FOR EXECUTION

(71) Applicant: Adobe Systems Incorporated, San Jose, CA (US)

(72) Inventors: Christopher Douglas Laine, San Jose, CA (US); Benjamin David Follis, London (GB)

(73) Assignee: Adobe Systems Incorporated, San Jose, CA (US)

( * ) Notice: Subject to any disclaimer, the term of this patent is extended or adjusted under 35 U.S.C. 154(b) by 452 days.

(21) Appl. No.: 14/568,733

(22) Filed: Dec. 12, 2014

(65) Prior Publication Data

US 2016/0171634 A1 Jun. 16, 2016

(51) Int. Cl.
G06F 21/00 (2013.01)
G06Q 50/18 (2012.01)
G06Q 10/00 (2012.01)

(52) U.S. Cl.
CPC ............. *G06Q 50/18* (2013.01); *G06Q 10/00* (2013.01)

(58) Field of Classification Search
CPC ................................ G06F 21/64; G06Q 50/18
See application file for complete search history.

(56) References Cited

U.S. PATENT DOCUMENTS

| 7,139,910 | B1 * | 11/2006 | Ainsworth | G06Q 20/401 |
| | | | | 713/155 |
| 7,447,904 | B1 * | 11/2008 | Boggs | H04L 9/3236 |
| | | | | 713/155 |
| 8,589,272 | B1 * | 11/2013 | Broberg | G06Q 40/025 |
| | | | | 705/344 |
| 9,604,146 | B2 * | 3/2017 | Liu | A63F 13/12 |
| 2005/0102520 | A1 * | 5/2005 | Baxter | G06F 21/64 |
| | | | | 713/176 |
| 2006/0184865 | A1 * | 8/2006 | Chakraborty | G06Q 10/10 |
| | | | | 715/209 |
| 2008/0052520 | A1 * | 2/2008 | Lee | H04L 9/3247 |
| | | | | 713/176 |
| 2009/0235082 | A1 * | 9/2009 | Garrett | H04L 9/3281 |
| | | | | 713/178 |
| 2010/0257494 | A1 * | 10/2010 | Pouarz | G06F 17/504 |
| | | | | 716/111 |

(Continued)

*Primary Examiner* — Ali Shayanfar
(74) *Attorney, Agent, or Firm* — Kilpatrick Townsend & Stockton LLP

(57) ABSTRACT

In some embodiments, electronic signature service provides access to an electronic agreement by a signatory. The electronic signature service determines whether a change to the electronic agreement proposed by the signatory is acceptable. The proposed change can change a task that at least one signatory will legally be obligated to perform upon execution of the electronic agreement by all signatories. The electronic signature service determines the acceptability of the proposed change based on data indicative of changes that are acceptable to another signatory. The electronic signature service can update the electronic agreement with the proposed change based on verifying that the proposed change is acceptable. The electronic signature service can determine that the updated electronic agreement is legally binding on the signatories based on determining that the electronic agreement has been executed by all signatories.

20 Claims, 6 Drawing Sheets

(56) References Cited

U.S. PATENT DOCUMENTS

| | | | |
|---|---|---|---|
| 2011/0314293 A1* | 12/2011 | Yu | H04L 41/0233 |
| | | | 713/179 |
| 2013/0212583 A1* | 8/2013 | Gordon | G06F 9/44 |
| | | | 718/100 |
| 2015/0213568 A1* | 7/2015 | Follis | G06Q 50/18 |
| | | | 705/311 |
| 2016/0012556 A1* | 1/2016 | Moore | G06Q 50/18 |
| | | | 705/311 |

* cited by examiner

AUTOMATICALLY MODIFYING ELECTRONIC AGREEMENTS FOR EXECUTION

TECHNICAL FIELD

This disclosure relates generally to computer-implemented methods and systems and more particularly relates to automatically modifying electronic agreements for execution.

BACKGROUND

An electronic signature service is an online service that allows users to send electronic copies of contracts and other documents to one or more signatories. The electronic signature service may also allow individuals to access electronic copies of documents and to electronically sign the documents. For example, a user of an electronic signature service may upload a contract to the electronic signature service and specify individuals who must sign the contract. The electronic signature service may send a copy of the contract to the specified individuals, e.g., by email or other electronic means, or send an electronic notification to the specified individuals that the contract can be accessed and electronically signed via a website.

Organizations such as businesses and government agencies may use electronic signature services to obtain signatures for contracts and other agreements. These organizations may be willing to agree to altered terms of these contracts and other agreements. However, identifying acceptable terms of contracts and other agreements may require identifying personnel having the authority to negotiate these changes and directing these personnel to negotiate changes to contracts. If the same contract is provided to a large number of potential signatories (e.g., a sales contract provided to thousands or millions of customers), the organization may lack the required number of personnel to negotiate each contract individually. Furthermore, dedicating authorized agents to the task of negotiating the terms of contracts and other electronic agreements may impose higher costs in terms of diverted time and productivity than is desirable.

Utilizing agents of a signatory to identify acceptable terms of a contract may also present risks to the signatory. For example, a seller may designate a sales representative or other agent to negotiate terms of a contract on behalf of the seller. In some cases, the agent may exceed his authority to modify one or more terms of the contract during a negotiation (e.g., by agreeing to an unacceptable price change) without the buyer being aware that the agent's authority has been exceeded. In other cases, the agent's authority to negotiate the contract may be revoked prior to the completion of the negotiation without the buyer being aware of the revocation. In such cases, the seller may be obligated to fulfill the terms of the altered contract even though the terms of the contract were not properly negotiated by the agent of the seller.

It may be desirable to use an electronic signature service to automatically modify electronic agreements without requiring intervention by one or more signatories to the agreement (e.g., a provider or offeror in the contract or agreement).

SUMMARY

According to certain embodiments, an electronic signature service can be used for modifying an agreement involving at least a first signatory and a second signatory. The electronic signature service can allow the second signatory to modify the electronic agreement without contacting the first signatory or an agent of the first signatory. For example, the electronic signature service can provide electronic access to the electronic agreement by the second signatory (e.g., by transmitting a notification to the second signatory indicating that the agreement is available via the electronic signature service). The electronic signature service can determine the acceptability of a change to an attribute of the electronic agreement that is proposed by the second signatory. The proposed change can modify a task that one or more of the first and second signatories will legally be obligated to perform upon execution of the electronic agreement by the second signatory. The electronic signature service can determine the acceptability of the proposed change based on metadata indicative of changes that are acceptable to the first signatory. This metadata can be associated with the electronic agreement and can be inaccessible to the second signatory. The electronic signature service can update the electronic agreement with the proposed change based on verifying that the proposed change is acceptable. The electronic signature service can determine that the updated electronic agreement is legally binding on the first and second signatories based on determining that the electronic agreement is executed by the second signatory.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
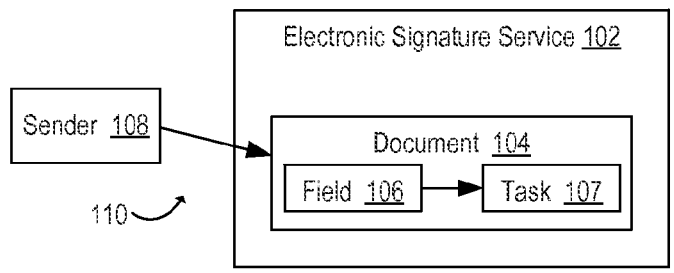
FIG. 1 is a modeling diagram that depicts an example of an electronic signature service that can automatically modify electronic agreements for execution according to certain exemplary embodiments.

Computer-implemented systems and methods are disclosed for an electronic signature service that can automatically modify electronic agreements that can be sent to multiple signatories for execution. When a signatory wants to change the terms of an electronic agreement, such modifications have previously required contacting another signatory for approval. Contacting other signatories for approval can be particularly burdensome on both a data network and the other signatory if the other signatory has already executed the agreement, because doing so requires additional electronic communications to and from the other signatory and additional time and attention on his or her part. Contacting other signatories for approval can also be burdensome because doing so requires waiting for and receiving subsequent electronic communications that include approvals (and possibly rejections) of the modified agreement.

These inefficiencies, delays, and burdens on signatories and data networks can be reduced or eliminated by collecting and using information from one or more signatories to establish modification rules for automatically determining the acceptability of modifications to an electronic agreement and consequently modifying the agreement automatically in appropriate cases. The modification rules can be specified by a first signatory contemporaneously with the first signatory executing the agreement, and any changes can then be automatically performed in accordance with the specified modification rules during a session or transaction in which the agreement is executed by a second signatory. For example, an electronic signature service can automatically modify the agreement using the modification rules using communications with the second signatory (or a set of second signatories), which allows the electronic signature service to modify the electronic agreement without having to contact the first signatory or an agent of the first signatory for approval and/or re-execution.

Using an electronic signature service to modify an electronic agreement or other document without contacting a signatory or an agent of the signatory can increase the feasibility of altering electronic documents in scenarios involving large numbers of signatories. For example, the electronic signature service may obviate the need to dedicate personnel to the task of reviewing and consenting to altered terms that would be acceptable to a provider of the electronic agreement. Obviating the need to utilize such personnel may increase the number of electronic documents or agreements that are executed by signatories.

Using an electronic signature service to modify an electronic agreement or other document without contacting a signatory or an agent of the signatory can also decrease the likelihood of agreements being altered in a manner that is unacceptable to the signatory. For example, the electronic signature service may reduce or avoid the risk of a signatory's agent exceeding his or her authority by only utilizing initial communications from the signatory to identify one or more rules for determining the acceptability of changes to the document.

The following non-limiting example is provided to help introduce the general subject matter of certain embodiments. A first entity (e.g., an individual or an organization) may subscribe to an electronic signature service. The first entity may provide an electronic document to the electronic signature service along with data identifying at least one individual authorized to execute the electronic document on behalf of the entity. The entity and/or the authorized signatory may also provide one or more rules identifying different changes to the agreement that be performed after the authorized individual has executed the document on behalf of the entity. If the document is changed in accordance with these rules, the document can be legally binding on the entity upon execution of the document by a second entity without requiring the first entity to approve changes to the document.

For example, a modification rule provided by the first entity can be used by the electronic signature service to modify a contract offering a specific item for sale at a given price. The contract may be modified by a second entity such that the price is changed to a value selected from a range of acceptable prices. The first entity may cause the electronic signature service to provide access to the contract by the second entity (e.g., by sending a copy of the contract to the second entity, by sending an e-mail to the second entity with a link to the contract at the electronic signature service, etc.). The second entity may reject the contract with the given price and propose a modified price. The electronic signature service can determine from the rule that the modified price is within the range of acceptable prices. Based on this determination, the electronic signature service can notify the second entity that the modified price is acceptable. The second entity can execute the contract via the electronic signature service. The execution of the contract by the second entity can cause the contract to be legally binding upon both the first and second entities.

In accordance with some embodiments, the electronic signature service used by a first signatory to an electronic agreement may be executed on a server system or other computing system and may allow a second signatory to modify the electronic agreement. The electronic signature service can provide electronic access to the electronic agreement by the second signatory. The electronic signature service can determine the acceptability of a proposed change to an attribute of the electronic agreement from the second signatory. The proposed change can modify a task that one or more of the first and second signatories will legally be obligated to perform upon execution of the electronic agreement by the second signatory. The electronic signature service can determine the acceptability of the proposed change based on metadata indicative of changes that are acceptable to the first signatory. For example, this metadata can include one or more modification rules, as discussed in the example above. This metadata can be associated with the electronic agreement and can be inaccessible to the second signatory. The electronic signature service can update the electronic agreement with the proposed change based on verifying that the proposed change is acceptable. The electronic signature service can determine that the updated electronic agreement is legally binding on the first and second signatories based on determining that the electronic agreement is executed by the second signatory.

As used herein, the term "electronic signature service" is used to refer to an application executable by a processing device, firmware, hardware, or any combination thereof that receives, provides, maintains, or otherwise accesses information about senders of documents, signatories for documents, contract, etc. that is sufficient to verify that the documents have been signed. In some embodiments, the electronic signature service can maintain information about electronic documents that is sufficient to legally enforce the terms of the documents. For example, an electronic signature service may store a document such as a contract as well as data indicating that one or more individuals have signed the contract. In some embodiments, an electronic signature service can automatically record and store details of a document's history, thereby allowing for auditing of the process by which the document was signed by various signatories. In some embodiments, an electronic signature service can be hosted or otherwise implemented by a server or group of servers accessible via a data network (e.g., the Internet). In additional or alternative embodiments, an electronic signature service can be hosted or otherwise implemented by a stand-alone computing device.

Any suitable combination of hardware, software, firmware, etc. can be used to implement the workflow and or processes involved in the electronic signature service. In some embodiments, the electronic signature service can be an application that is executable by any suitable processing device. In other embodiments, the electronic signature service can include a combination of executable programing instructions and the processing device used to execute the instructions. In other embodiments, the electronic signature service can include a firmware for implementing the processes involved in the electronic signature service. In other embodiments, the electronic signature service can include a server system that can execute program code for implementing the processes involved in the electronic signature and that can host the data used by the electronic signature service.

As used herein, the terms "electronically sign" and "electronically execute" are used to refer to any action by which an electronic copy of a document may be modified or otherwise used to indicate that a signatory has accepted and agreed to one or more provisions of the document. Electronically signing a document may have the same legal effect as printing a copy of the document and physically adding a signatory's signature to the document. Any suitable action can be used to electronically sign a document (perhaps depending on the law of the relevant jurisdiction). Examples of electronically signing a document include typing an individual's name in a certain field on the document, adding an electronic image of the individual's handwritten signature to the document, faxing or otherwise electronically transmitted a manually signed copy of the document to the electronic signature service, etc.

As used herein, the term "signatory" is used to refer to a person that is intended to sign or has signed a document and the term "authorized signatory" is used to refer to a signatory who is authorized (or possibly required) to sign a document in order for the document to be legally binding upon the person or an organization associated with the person.

As used herein, the term "electronically provide" is used to refer to any action by which an electronic copy of a document may be transmitted to a signatory or any electronic communication by which a signatory may be notified that a copy of the document is available for signature.

As used herein, the term "legally binding" is used to refer to a document requiring one or more legally enforceable actions by one or more individuals. For example, a document such as a contract may become legally binding when each party to the contract may institute a legal action in order to compel action by another party to the contract.

As used herein, the term "organization" is used to refer to entity including one or more individuals organized for working collectively to achieve one or more common goals. Examples of an organization include business entities (e.g., small businesses, partnerships, sole proprietorships, corporations, etc.), government entities (e.g., government agencies, legislative bodies, military units, etc.), non-profit organizations, etc.

In some embodiments, utilizing an electronic signature service to automatically modify an electronic document without contacting a signatory the document, as described herein, can improve one or more functions performed by a system that includes multiple computing devices in communication via one or more data networks. For example, the electronic signature service can modify the electronic document using electronic communications from fewer than all signatories to an agreement during a negotiation or other transaction rather than using electronic communications from all signatories during the negotiation or other transaction. Limiting the transmission of electronic communications in this manner can reduce the data traffic between one or more servers and the computing devices associated with the signatories, and can thereby result in a more efficient use of the communication networks among multiple computing devices.

The electronic signature service can be used to manage modifications of documents that is are electronically accessed by larger numbers of recipients. For example, a first signatory can apply one or more modification rules to some or all copies of electronic documents of a given class (e.g., a contract for phone service). When an agent of the signatory provides access to an electronic document included in the class, the modification rules can be applied. The membership of the document in the class can be identified by the agent or automatically determined by content analysis. In some embodiments, the modification rules can be applied without an agent of the signatory knowing or having access to the modification rules. In some embodiments, one or more modification rules can be associated with a document template. Documents created from the template can inherit one or more of the modification rules from the template. The created documents may inherit these rules even if the created documents have at least some content different from the document template (e.g., values for fields left blank in the template, values for fields that are different from the values in the template fields, etc.). Creating documents from templates to which one or more modification rules apply can thereby allow large numbers of documents with customized content to be generated and modified under specified conditions in a manner that reduces, eliminates, or minimizes the amount of interaction from a human agent to do so.

Referring now to the drawings, FIG. 1 is a modeling diagram that depicts an example of an electronic signature service 102 that can automatically modify electronic agreements for execution. The electronic signature service 102 can store, host, or otherwise provide access to one or more electronic documents 104. An electronic document 104 can include one or more fields 106. A field 106 can be associated with one or more attributes of one or more tasks 107 identified in or otherwise associated with the electronic document 104. For example, a value of a field 106 can control, identify, or otherwise indicate the conditions required for one or more signatories of the electronic document to complete a task 107 in accordance with legal obligations of the electronic document 104. For instance, a task 107 may involve the sale of goods or services, and the field 106 may include a quantity or purchase price associated with the sale. The value of the field 106 may thus specify the quantity or purchase price that a signatory is obligated to provide or pay under the terms of the electronic document 104.

Figure 12:
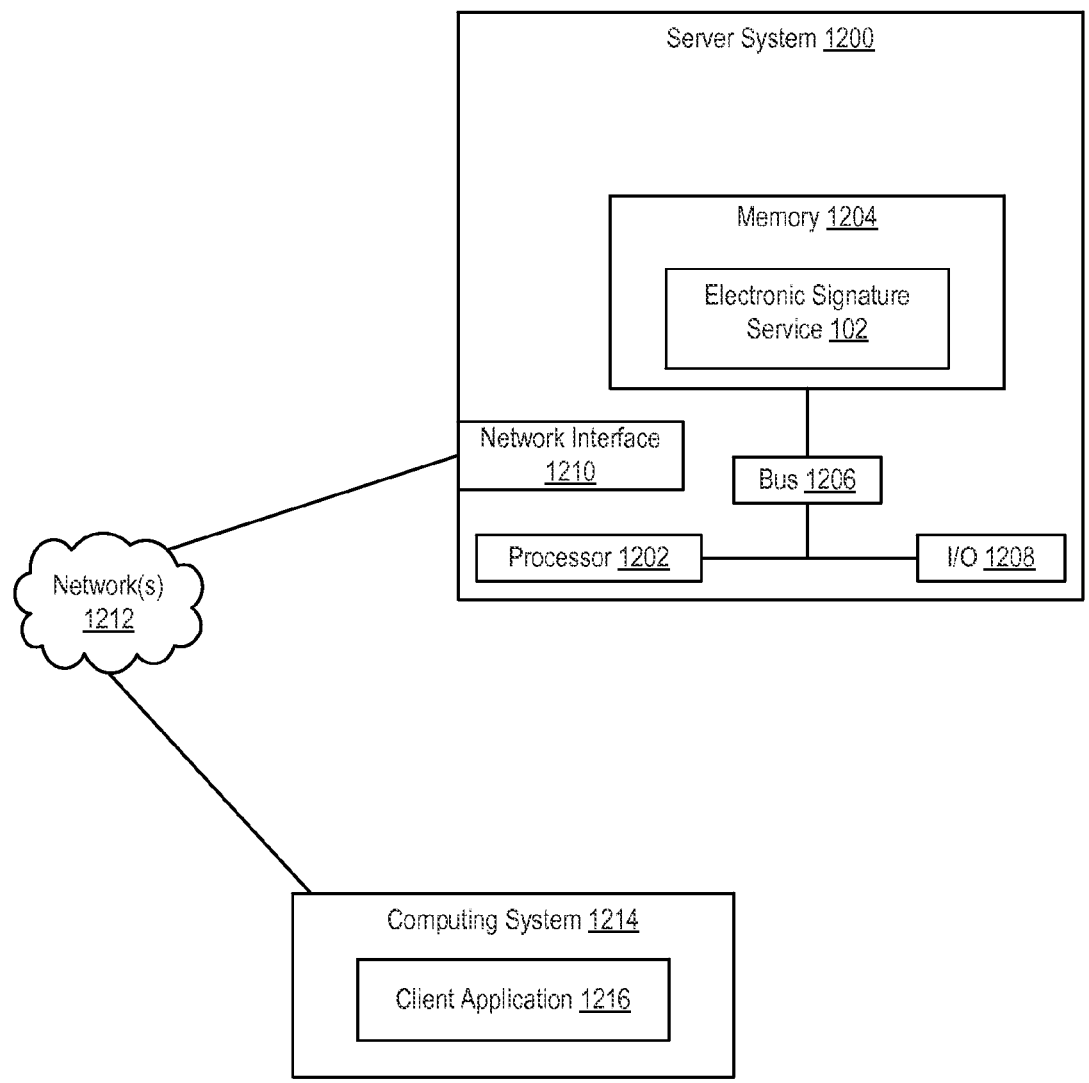
FIG. 12 is a block diagram that depicts an example of a server system for implementing certain embodiments.

The electronic signature service 102 can be hosted or otherwise implemented by any suitable server system and can be accessed by other computing devices via any suitable data network (see, e.g., FIG. 12). For example, the electronic signature service 102 may be accessed by computing devices operated by a sender 108 of an electronic document 104. Examples of a sender 108 include a vendor, an individual in the legal department of an organization, etc. In one example, the electronic signature service 102 may be executed on a server system accessible by other computing devices via the Internet (e.g., via a Web-based or other network interface). In another example, the electronic signature service 102 may be executed on a server system accessible by other computing devices via an electronic mail or fax communication system.

A sender 108 can provide the electronic document 104 to the electronic signature service 102 via any suitable electronic communication 110. Examples of performing a suitable electronic communication 110 include uploading the electronic document 104 via a website for accessing the electronic signature service 102, sending the electronic document 104 in an e-mail attachment to a server that executes or is in communication with the electronic signature service 102, faxing the electronic document 104 to a server that executes or is in communication with the electronic signature service 102, etc.

The electronic signature service 102 can identify a field 106 of the electronic document 104 in any suitable manner. In one example, the electronic document 104 may be a form such as a PDF document having fillable fields. The electronic signature service 102 can identify the fillable fields from the metadata of the PDF document. In another example, the electronic document 104 may be an image file. The electronic signature service 102 may scan or otherwise analyze the electronic document 104 to detect one or more portions of the image file that can be used as fields. For example, the electronic signature service 102 can convert an image file to a PDF file. The electronic signature service 102 can perform optical character recognition ("OCR") or another suitable algorithm to detect content in the converted PDF file. The electronic signature service 102 can determine that one or more shapes or spaces in the image file appear to be appropriate for data entry (e.g., a line segment below white space or a rectangle surrounding white space that is adjacent to text). The electronic signature service 102 can automatically identify a shape or space as a field 106 and/or display a prompt to a user soliciting input to confirm that the shape or space is the field 106.

In some embodiments, the electronic signature service 102 can automatically determine that a visual element in a document is used for entering data into a field. For example, some forms (e.g., HTML documents) may have fields that are defined for data input. A user can select the input field to enter data into the field. In additional or alternative embodiments, the electronic signature service 102 can determine that a visual element is used for entering data into a field based on a user's interaction with the field. For example, in a document such as an image, a user can click a portion of the image or otherwise interact with the image portion. The electronic signature service 102 can create a field in the image document at the image portion based on the user's interaction with the image portion.

Figure 2:
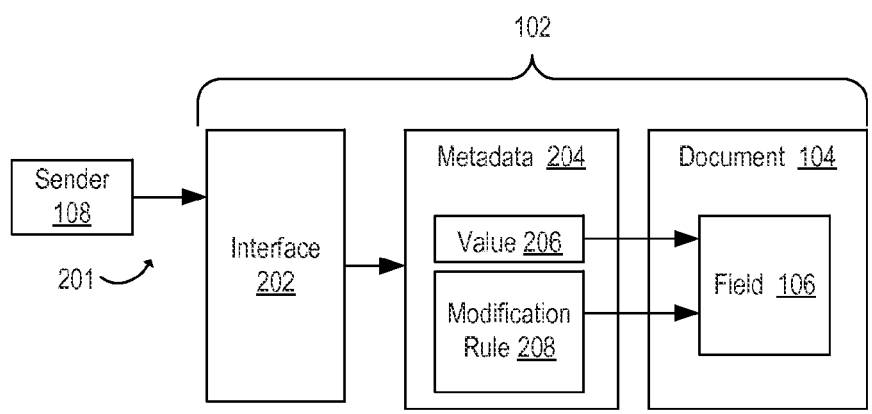
FIG. 2 is a modeling diagram that depicts an example of the electronic signature service obtaining metadata used for identifying acceptable changes to an electronic document according to certain exemplary embodiments.

The electronic signature service 102 can obtain data from the sender 108 or an entity associated with the sender 108 that identifies or otherwise indicates changes to one or more attributes of the electronic document 104 (e.g., the field 106, the task 107) that are acceptable to the sender 108. For example, FIG. 2 is a modeling diagram that depicts an example of the electronic signature service 102 obtaining metadata 204 used for identifying acceptable changes to the electronic document 104.

The metadata 204 can include any data that can be used by the electronic signature service 102 to identify acceptable changes to one or more attributes of the electronic document 104. The metadata 204 can include one or more values 206 for the field 106 and one or more modification rules 208 associated with the field 106. The value 206 can be, for example, a default value or initial offer value for the electronic document 104 included in the field 106. The modification rule 208 can include one or more rules that can be used in an algorithm executed by the electronic signature service 102 to identify acceptable changes to the field 106 or other attributes of the electronic document 104. Examples of the modification rule 208 include data or code describing the changes in price, changes in quantity, changes in tasks to be performed, etc.

The metadata 204 can be associated with the electronic document 104 in any suitable manner. In some embodiments, the metadata 204 can be embedded within the electronic document 104 by the electronic signature service 102 or another suitable application. Embedding the metadata 204 in the electronic document 104 can allow the electronic signature service 102 to subsequently access the modification rule 208 directly from the electronic document 104. The metadata 204 embedded in the electronic document 104 can be encrypted or otherwise made inaccessible to a computing system or application other than the electronic signature service 102.

In additional or alternative embodiments, the metadata 204 can be stored separately from the electronic document 104. For example, the metadata 204 may be stored in a non-transitory computer-readable medium accessible to the electronic signature service 102 using a database or other suitable data structure. Copies of the electronic document 104 provided to signatories can include an identifier for the record in the database or other data structure in which the metadata 204 is stored. The electronic signature service 102 can use the identifier to access the metadata 204 from the database or other data structure. Storing the metadata 204 separately from the electronic document 104 can keep the metadata 204 inaccessible to a signatory of the document 104 other than the sender 108.

The sender 108 can transmit at least some of the metadata 204 to the electronic signature service 102 via a suitable electronic communication 201. The metadata 204 can be included in, generated using, or otherwise obtained from the data included in the electronic communication 201. In some embodiments, the electronic communication 201 can be transmitted via an interface 202 that is provided by the electronic signature service 102. The electronic communication 201 can include data generated from inputs received via the interface 202.

The metadata 204 can be provided to the electronic signature service 102 via any suitable process. In one example, the sender 108 or an entity associated with the sender 108 may subscribe to the electronic signature service 102 in order to facilitate the execution of documents on behalf of the sender 108 or the entity associated with the sender 108. The sender 108 or the entity associated with the sender 108 may provide the metadata 204 to the electronic signature service 102 contemporaneously with the electronic document 104 being provided to the electronic signature service 102.

In some embodiments, the electronic communication 201 can be transmitted during a session in which the sender 108 has executed the electronic document 104 or has otherwise agreed to be legally obligated by the provisions of the electronic document 104. For example, the metadata 204 can be obtained using input received from the sender 108 during a session in which the sender 108 executes the electronic document 104. In additional or alternative embodiments, the data can be obtained using input received from a first individual associated with the sender 108 during a first transaction and a second individual associated with the sender 108 can execute the electronic document 104 during a second session subsequent to the first session.

Although, for illustrative purposes, FIG. 2 depicts metadata 208 being associated with a specific document 104, additional or alternative implementations are possible. For example, metadata 208 and/or modification rules 208 can be applied to or otherwise associated with a given class of documents 104 (e.g., a contract for phone service). The membership of a given document in the class can be identified in any suitable manner (e.g., input received by the electronic signature service 102, content analysis of the document 104, etc.). The metadata 208 or other data included in or associated with a document 104 can include an identifier for the class. The modification rules can be applied to one or more documents in the class based on the documents belonging to the class. For example, the electronic signature service 102 can apply the modification rules for a given class to the document based on determining from an identifier that the document is included in the class. In some embodiments, the modification rules can be applied without an agent of the signatory knowing or having access to the modification rules 208.

In additional or alternative embodiments, one or more modification rules 208 can be associated with a document 104 that is a template for other electronic documents. Documents created from the template can inherit one or more of the modification rules 208 from the template. The created documents may inherit these rules even if the created documents have at least some content different from the document template (e.g., values for fields left blank in the template, values for fields that are different from the values in the template fields, etc.). Creating documents from templates to which one or more modification rules apply can thereby allow large numbers of documents with customized content to be generated and modified under specified conditions in a manner that reduces, eliminates, or minimizes the amount of interaction from a human agent to do so.

Figure 3:
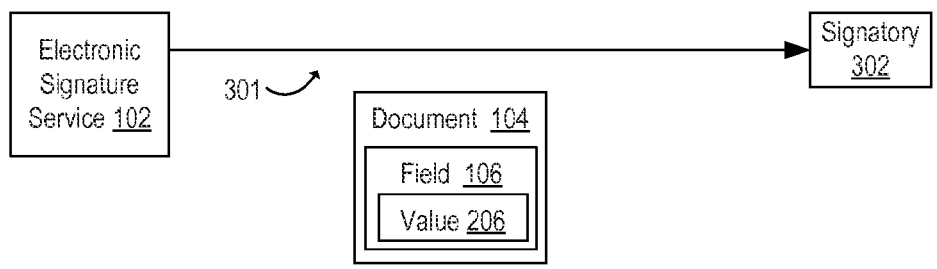
FIG. 3 is a modeling diagram that depicts an example of the electronic signature service providing access to the document by at least one signatory according to certain exemplary embodiments.

FIG. 3 is a modeling diagram that depicts an example of the electronic signature service 102 providing access to the electronic document 104 by at least one signatory 302. The electronic signature service 102 can notify the signatory 302 that the electronic document 104 is available for signature via any suitable electronic communication 301. In some embodiments, the electronic communication 301 can include a copy of the electronic document 104. In one example, the electronic signature service 102 can send an e-mail to the signatory 302 with a copy of the electronic document 104 as an e-mail attachment. In another example, the electronic signature service 102 can transmit a copy of the electronic document 104 via facsimile or other electronic communication channels to the signatory 302. In other embodiments, the electronic communication 301 can notify the signatory 302 without including a copy of the electronic document 104. For example, the electronic signature service 102 can send electronic messages (e.g., e-mail, text message, etc.) that include a link to a website via which the signatory 302 may access the electronic document 104 using the electronic signature service 102. In other embodiments, the electronic communication 301 can include a copy of the electronic document 104 as well as a link to a website or other network location via which the signatory 302 may access and sign the electronic document 104 using the electronic signature service 102.

Figure 4:
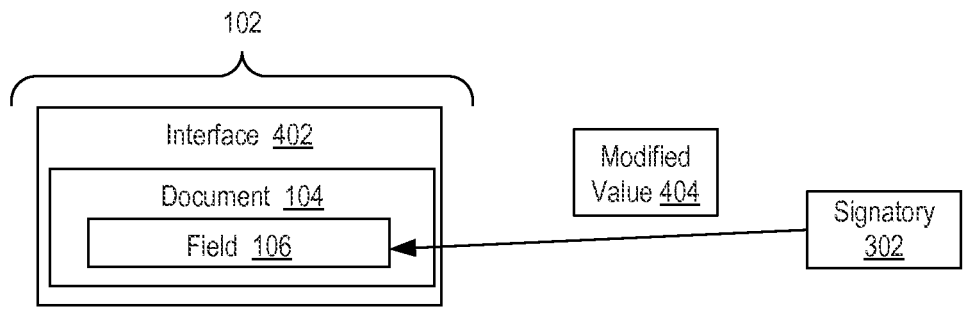
FIG. 4 is a modeling diagram that depicts an example of the electronic signature service receiving a proposed change to the document from the signatory according to certain exemplary embodiments.

The signatory 302 may use one or more computing devices to propose one or more changes to the electronic document 104. For example, FIG. 4 is a modeling diagram that depicts an example of the electronic signature service 102 receiving a proposed change to the electronic document 104 from the signatory 302. A computing device associated with the signatory 302 can access the electronic document 104 via an interface 402 provided by the electronic signature service 102 (e.g., a webpage). In some embodiments, the interface 402 may display visual indicators identifying one or more fields 106 for which the electronic signature service 102 will accept proposals for changes (e.g., visual indicators identifying one or more negotiable terms of a contract). The computing device associated with the signatory 302 can transmit data via the interface 402 that identifies, selects, or otherwise indicates a proposed change to the electronic document 104. As depicted in FIG. 4, the proposed change to the electronic document 104 can be a modified value 404 for the field 106. The modified value 404 can alter an attribute of the task 107.

In some embodiments, the electronic signature service 102 can use one or more processes to verify that the entity from which the proposed change was received is actually the authorized signatory 302. Any suitable process for verifying a signatory 302 can be used. Examples of such processes include requiring the signatory 302 to provide one or more credentials or other authentication information (e.g., password, personal identification number, etc.) to the electronic signature service 102, requiring the signatory 302 to provide biometric data (e.g., a fingerprint) to the electronic signature service 102, verifying that the network identifier (e.g., an IP address) from which a signature is received is known to the electronic signature service 102 or belongs to a trusted domain, etc.

Figure 5:
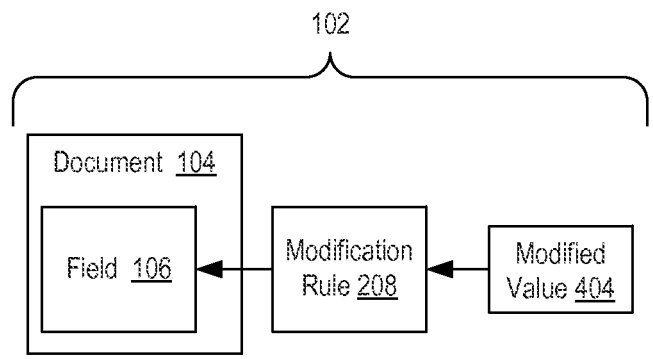
FIG. 5 is a modeling diagram that depicts an example of the electronic signature service verifying the acceptability of the proposed change to the document according to certain exemplary embodiments.

FIG. 5 is a modeling diagram that depicts an example of the electronic signature service 102 verifying the acceptability of the proposed change to the electronic document 104. The electronic signature service 102 can use the modification rule 208 to determine whether the modified value 404 is an acceptable change to the value 206. In some embodiments, the electronic signature service 102 can compare the modified value 404 to a range of acceptable values (e.g., prices) for the field 106 that are stored in a non-transitory computer-readable medium accessible to the electronic signature service 102. If the modified value 404 is within the range of acceptable values, the electronic signature service 102 can determine that the modified value 404 is acceptable. In additional or alternative embodiments, the electronic signature service 102 can determine a value for the electronic document 104 based on the modified value 404 and one or more other values in fields of the electronic document 104. For example, an electronic document 104 such as a contract may be associated with a transaction, such as a sale. A value for the transaction can be determined based on a quantity of units and a price for each unit. The modification rule 208 may indicate that the transaction value, which is the product of the quantity of units and the price for each unit, must be above a threshold transaction value. If the modified value 404, which may modify one or both of the quantity of units and the price for each unit, causes the product of the quantity of units and the price for each unit to exceed the threshold transaction value, the electronic signature service 102 can determine that the modified value 404 is acceptable. Additional examples of modification rules 208 that can be applied by the electronic signature service 102 are provided below with respect to FIGS. 7-11.

Figure 6:
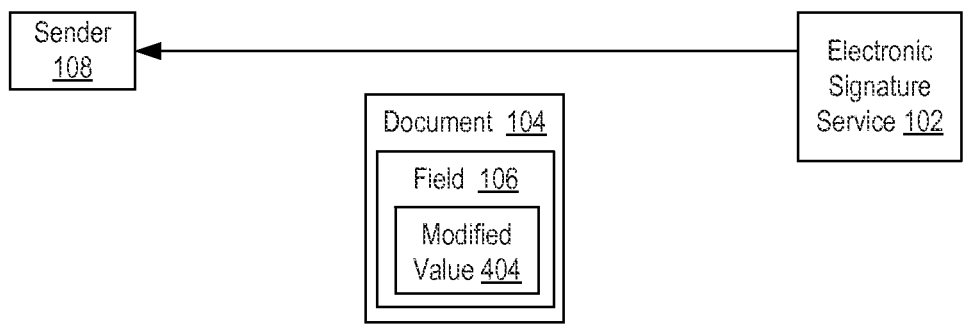
FIG. 6 is a modeling diagram that depicts an example of the electronic signature service providing the executed document with the proposed change to the sender according to certain exemplary embodiments.

FIG. 6 is a modeling diagram that depicts an example of the electronic signature service 102 providing the updated electronic document 104 with the proposed change to the sender 108. The updated electronic document 104 can include the modified value 404 for the field. The electronic signature service 102 can provide the updated electronic document 104 to the sender 108 based on determining that the modified value 404 is acceptable and determining that the signatory 302 has executed the document. For example, the electronic signature service 102 can notify the signatory 302 that the modified value 404 is acceptable. The electronic signature service 102 can receive a suitable electronic communication from a computing device associated with the signatory 302 indicating that the signatory 302 has executed the electronic document 104. The electronic signature service 102 can respond to receiving this communication by notifying the sender 108 that the updated electronic document 104 is executed. Execution of the electronic document 104 by the signatory 302 can make the electronic document 104 with the modified value 404 legally binding upon the sender 108 and the signatory 302.

For illustrative purposes, FIGS. 1-7 depict the electronic signature service 102 providing the electronic document 104 to a single signatory 302. However, other implementations are possible. For example, an electronic document 104 may be associated with multiple signatories (e.g., multiple parties to a contract who are obligated to collectively perform one or more tasks 107 in the contract and/or to perform different tasks 107 in the contract). One or more modification rules 208 may specify how to allow different signatories 302 to propose changes to the electronic document 104.

In some embodiments, access to the electronic document 104 can be provided sequentially to each of the signatories 302 such that only one signatory can access and/or propose modifications to the document at a given time. One or more of the modification rules 208 may specify that if a given field 106 has been modified based on changes proposed by a first signatory 302, the same field 106 cannot be modified based on proposals from a second signatory 302 that receives access to the electronic document 104 subsequent to the first signatory 302.

In additional or alternative embodiments, different signatories 302 may be associated with different modification rules 208 that restrict the different signatories 302 to modifying attributes of tasks 107 associated with those signatories. In one example, one or more modification rules 208 may allow or restrict the capability of specific signatories 302 to propose changes based on the signatories' role within an organization. In another example, a first signatory 302 may be obligated by the electronic document 104 to perform a first task 107, and a second signatory 302 may be obligated by the electronic document 104 to perform a second task 107. One or more modification rules 208 may specify that the first signatory 302 is prevented from proposing modified values 404 that affect the second task 107 and that the second signatory 302 is prevented from proposing modified values 404 that affect the first task 107. For example, the electronic signature service 102 may determine from the modification rule 208 that a proposal for a modified value 404 is unacceptable based on the proposal being received from a signatory 302 that is not associated with a task 107 corresponding to the modified value 404.

Figure 7:
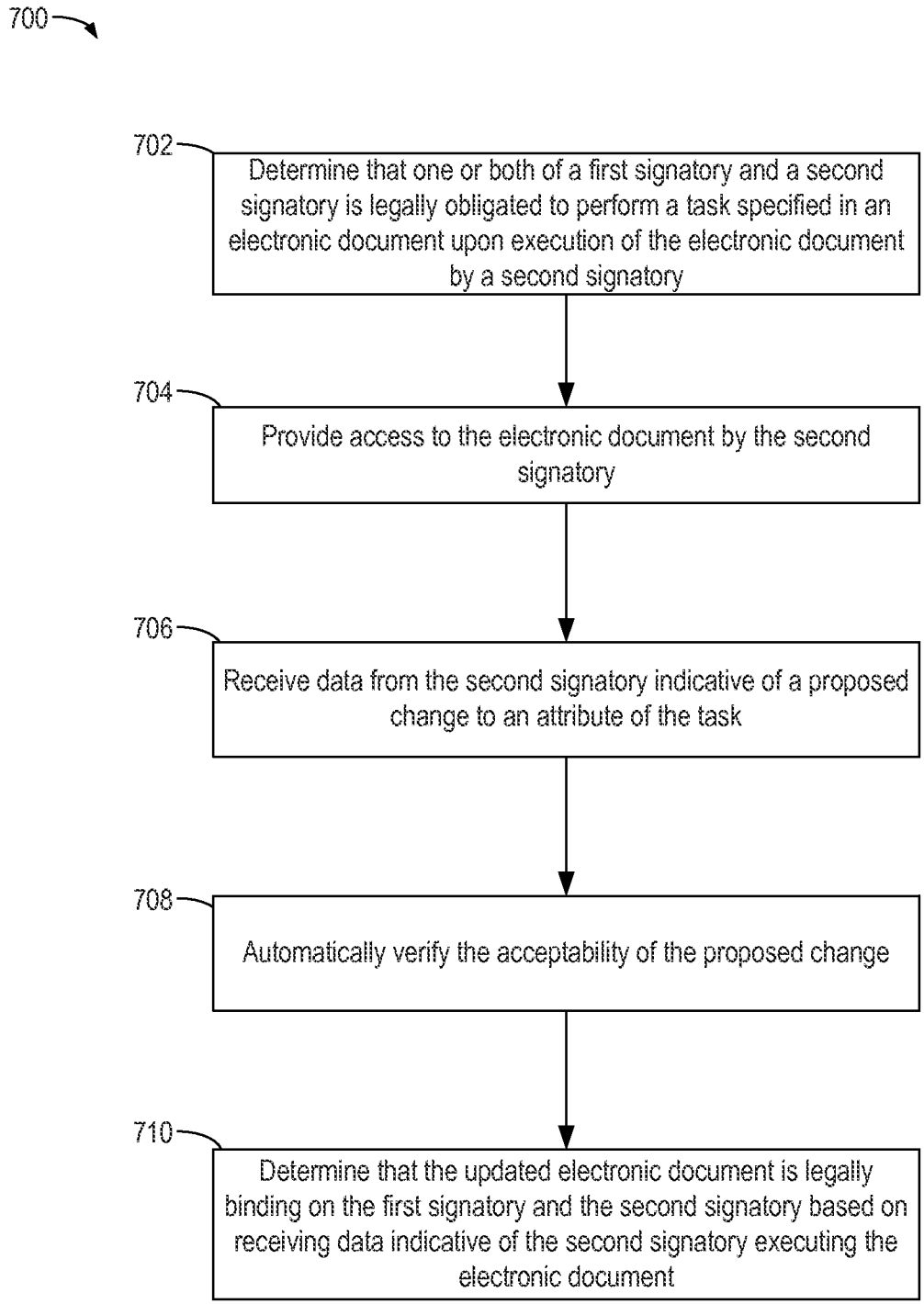
FIG. 7 is a flow chart that depicts an example of a method for automatically modifying electronic agreements for execution according to certain exemplary embodiments.

FIG. 7 is a flow chart that depicts an example of a method 700 for automatically modifying electronic agreements for execution. For illustrative purposes, the method 700 is described with reference to the exemplary implementation depicted in FIGS. 1-6. Other implementations, however, are possible.

The method 700 involves determining that one or both of a first signatory and a second signatory are legally obligated to perform a task specified in an electronic document 104 upon execution of the electronic document 104 by a second signatory, as depicted in block 702. For example, one or more processing devices of the electronic signature service 102 can execute suitable program code stored in a non-transitory computer-readable medium to determine that a first signatory (e.g., the sender 108) and/or a second signatory 302 is legally obligated to perform a task 107 specified in the electronic document 104. In some embodiments, this determination may involve verifying that the first signatory has signed or otherwise indicated agreement with the electronic document 104 and that the first signatory has agreed to any changes in the electronic document 104 performed in accordance with the modification rule 208.

In some embodiments, the interface 202 can be used to verify that the first signatory has signed or otherwise indicated agreement with the electronic document 104 and that the first signatory has agreed to any changes in the electronic document 104 performed in accordance with the modification rule 208. For example, the electronic signature service 102 can receive, via the interface 202, a digital certificate or other signing data from the sender 108. The signing data can be data representing execution of the document 104 by the sender 108. The signing data can prevent the sender 108 from repudiating the terms of the electronic document 104. The electronic signature service 102 can store the digital certificate or other signing data in a suitable data structure associated with the electronic document 104 and the metadata 204. In some embodiments, the electronic signature service 102 may obtain the digital certificate or other signing data from the sender 108 in one communication that indicates the first signatory's consent to both the electronic document 104 and any changes in the electronic document 104 performed in accordance with the modification rule 208. In other embodiments, the electronic signature service 102 may obtain the digital certificate or other signing data from the sender 108 in a first communication that indicates the first signatory's consent to the electronic document 104, and the electronic signature service 102 may obtain the digital certificate or other signing data from the sender 108 again in a second communication that indicates the first signatory's consent to any changes in the electronic document 104 performed in accordance with the modification rule 208.

The electronic signature service 102 can receive the electronic document 104 from a computing device operated by the sender 108 via any suitable data network. For example, the electronic signature service 102 can receive a suitable electronic communication 110 via a network interface to a data network. The electronic communication 110 can provide the electronic document 104 from the sender 108 to the electronic signature service 102, as described above with respect to FIG. 1.

The method 700 also involves providing access to the electronic document 104 by the second signatory, as depicted in block 704. Any suitable electronic communication 301 can be used to provide the electronic document 104 to authorized signatory 302, as described above with respect to FIG. 3. For example, the electronic signature service 102 can transmit a copy of the electronic document 104 to the signatory 302 via a suitable data network and/or transmit a notification to the signatory 302 via a suitable data network that the electronic document 104 can be accessed via a specified website or other interface 402.

The method 700 also involves receiving data from the second signatory indicative of a proposed change to an attribute of the task, as depicted in block 706. For example, the electronic signature service 102 can receive data indicative of a proposed change to an attribute of the task 107 (e.g., a modified value 404) via a suitable electronic communication from a computing device associated with a signatory 302, as described above with respect to FIG. 4.

In some embodiments, the data indicative of a proposed change to an attribute of the task 107 can be a proposed change that is originated by the signatory 302 and transmitted to the electronic signature service 102.

In additional or alternative embodiments, a proposed change to an attribute of the task 107 can be a change to the attribute that is originated by the electronic signature service 102 based on the modification rule 208 and transmitted to the signatory 302. The data indicative of the proposed change received by the electronic signature service 102 at block 706 can be data indicating an acceptance of the proposed change by the signatory 302.

The method 700 also involves automatically verifying the acceptability of the proposed change, as depicted in block 708. For example, one or more processing devices of the electronic signature service 102 can execute suitable program code stored in a non-transitory computer-readable medium to verify the acceptability of the proposed change. In some embodiments, the acceptability of the proposed change can be verified by a processing device without receiving input from or otherwise contacting a first signatory (e.g., the sender 108) or an agent of the first signatory. The electronic signature service 102 can update the electronic document 104 (or a copy of the electronic document 104 to be executed by the sender 108 and a signatory 302) to include the proposed change based on verifying that the proposed change is acceptable.

The electronic signature service 102 can access the metadata 204 to verify the acceptability of the proposed change using the modification rule 208 included in the metadata 204. In some embodiments, an identifier of the electronic document 104 or a data structure in which the metadata 204 can be embedded in the electronic document 104. The electronic signature service 102 can access the identifier from the electronic document 104. The electronic signature service 102 can retrieve the metadata 204 using the identifier accessed from the electronic document 104. For example, the electronic signature service 102 can access the electronic document 104 in response to a request received from the signatory 302 (e.g., by the signatory clicking a link to the electronic signature service 102 in an electronic message) to access the electronic document 104. The electronic signature service 102 can present a copy of at least some portion of the electronic document 104 in the interface 402. The electronic signature service 102 can retrieve the metadata 204 from a non-transitory computer-readable medium accessible to the electronic signature service 102 (but inaccessible to the signatory 302) contemporaneously with presenting the electronic document 104 in the interface 402.

In additional or alternative embodiments, the metadata 204 can be embedded in the electronic document 104 and accessed from the electronic document 104 by the electronic signature service 102. For example, the electronic signature service 102 may transmit a copy of the electronic document 104 to the signatory 302 in an electronic communication. The copy of the electronic document 104 can include one or more fields 106 having values that may be modified by the signatory 302 to propose a change to the electronic document 104. The copy of the electronic document 104 can also include embedded metadata 204. The signatory 302 can transmit a modified copy of the electronic document 104 with a modified value 404 to the electronic signature service 102. The electronic signature service 102 can access the metadata 204 from the modified copy of the electronic document 104 to determine the acceptability of the proposed change.

In some embodiments in which the metadata 204 is embedded in the electronic document 104, the metadata 204 can be encoded or otherwise hidden such that an application used by the signatory 302 to access the electronic document 104 cannot access the metadata 204. In one example, the electronic document 104 may be configured such that accessing the metadata 204 causes the metadata 204 to be modified (e.g., by updating a "last modified" or "last accessed" timestamp). The electronic signature service 102 can compare metadata 204 in a copy of the electronic document 104 that has been received from a signatory with the metadata 204 in a stored version of the electronic document 104 that is accessible to the electronic signature service 102. The electronic signature service 102 can determine from the comparison whether the metadata 204 from the received copy of the document 104 is different from the metadata 204 of the stored copy of the document 104 (i.e., whether the metadata 204 was accessed and altered by a signatory). In another example, attempts to modify or otherwise access embedded metadata 204 of a document 104 can be detected by digitally signing the metadata 204 of the document 104. The digital signature for the metadata 204 can be used by the electronic signature service 102 to detect tampering with the metadata 204. The electronic signature service 102 can use data indicative of an attempt to modify the metadata 204 to determine whether the metadata 204 was accessed by the signatory 302 (e.g., in order to determine a value of the filed 106 that is most advantageous to the signatory 302). The electronic signature service 102 can respond to determining that the signatory 302 has accessed the metadata 204 by rejecting the proposed change by the signatory 302. In some embodiments, the electronic signature service 102 can respond to determining that the signatory 302 has accessed the metadata 204 by notifying the signatory 302 that the transaction involving the electronic document 104 has been canceled.

In embodiments in which the proposed change is originated by the signatory 302, the electronic signature service 102 can verify the acceptability of the proposed change by determining if one or more values associated with the proposed change correspond to values determined from or included in the modification rule 208. In embodiments in which the proposed change is originated by the electronic signature service 102 based on the modification rule 208, the electronic signature service 102 can verify the acceptability of the proposed change prior to providing the proposed change to the signatory 302.

In some embodiments, verifying the acceptability of the proposed change can involve determining whether the modified value 404 included in the proposed change is within a specified set of values. For example, the modification rule 208 may specify that a price (or other attribute of an electronic agreement) differs from a default value 206 and is within a range of acceptable values specified in the metadata 204. The electronic signature service 102 can compare the modified value 404 to the range of acceptable values from the metadata 204 to determine the acceptability of the modified value 404.

In additional or alternative embodiments, verifying the acceptability of the proposed change can involve determining whether the modified value 404 included in the proposed change is within a threshold of the initial or default value 206. In one example, the modification rule 208 may specify that a modified value 404 is acceptable if the modified value 404 differs from the default value 206 by a specified amount. In another example, the modification rule 208 may specify that a modified value 404 that differs from the default value 206 by a specified percentage is acceptable. The electronic signature service 102 can identify the threshold difference from the initial or default value 206 based on the modification rule 208. The electronic signature service 102 can use the threshold difference to determine the acceptability of a modified value 404.

In additional or alternative embodiments, verifying the acceptability of the proposed change can involve determining whether an acceptable transaction value for a transaction involving the electronic document 104 is provided by the modified value 404 in combination with changes to other attributes of the electronic document 104. For example, a modification rule 208 specified in the metadata may identify a relationship between multiple fields 106 that are used to determine a transaction value for the transaction involving the electronic document 104. For instance, a relationship between two fields 106, such as the product of a "quantity of units" field and a "price per unit" field (e.g., "If quantity>10 price must be between 20 and 25"), may identify the transaction value. (Other types of fields having other relationships may also be used to determine a transaction value.) The modification rule 208 may identify a threshold transaction value for the transaction. A set of default or initial values 206 for a set of fields 106 in the electronic document 104 may provide a transaction value that is greater than or equal to the threshold transaction value. The electronic signature service 102 may determine that the proposed change includes a set of modified values 404 for the fields 106. The electronic signature service 102 may determine that the modified values 404 for the fields 106 provide the same transaction value as the default or initial values 206 or a different transaction value that is greater than or equal to the threshold value. The electronic signature service 102 can determine that the modified values 404 are acceptable based determining that the modified values 404 provide a transaction value that is greater than or equal to the threshold value.

In additional or alternative embodiments, the electronic signature service 102 can determine the acceptability of the proposed change based on the modified value 404 in combination with other aspects of the transaction that involve the electronic document 104. For example, the modification rule 208 may specify that modified values received within a first time period after providing access to the electronic document 104 are acceptable (e.g., "signatory has signed within 10 minutes of receiving the contract") and that modified values received within a second time period after providing access to the electronic document 104 are not acceptable. The electronic signature service 102 can determine the acceptability of the proposed change based on whether the proposed change was provided within the first time period.

In additional or alternative embodiments, verifying the acceptability of the proposed change can involve utilizing real-time analytical data or other data accessible by the electronic signature service 102 to determine whether the modified value 404 will provide an acceptable value for a transaction involving the electronic document 104. For example, a modification rule 208 specified in the metadata may identify a relationship between a current inventory of a product and an acceptable price, range of prices, or threshold variation in prices. For a larger inventory, the modification rule 208 may specify a first acceptable price, range of prices, or threshold variation in prices for the field 106. For a smaller inventory, the modification rule 208 may specify a second acceptable price, range of prices, or threshold variation in prices for the field 106. At block 708, the electronic signature service 102 may determine the acceptability of the modified value 404 by accessing a data source that is specified in the modification rule and that includes real-time data used by the modification rule 208. The data source may be identified from the metadata 204. The electronic signature service 102 may determine the acceptability of the modified value 404 based on one or more modification rules 208 utilizing accessed data value from the source of real-time data.

In additional or alternative embodiments, verifying the acceptability of the proposed change can also involve determining that automatic modifications to the electronic document 104 are permitted by law in a jurisdiction associated with the signatory 302. For example, some jurisdictions may not permit modifications to the electronic document 104 to become legally binding without notification of the sender 108. Applicable laws governing different jurisdictions may be stored in a data source accessible to the electronic signature service 102. In some embodiments, the electronic signature service 102 can identify a geographic location associated with the signatory 302 and compare the identified geographic location to determine whether modifications to the electronic document 104 can become legally binding without notifying the sender 108. For example, the electronic signature service 102 can identify a geographic location associated with the signatory 302 based on an IP address of a computing device associated with the signatory 302, an address stored in a user profile for the signatory 302 in the electronic signature service 102, an address for the signatory 302 entered in one of the fields 106 of the electronic document 104, etc. In additional or alternative embodiments, the electronic signature service 102 can require that the signatory 302 consent to be bound by the laws of a jurisdiction in which modifications to the electronic document 104 can become legally binding without notification of the sender 108. For example, the electronic signature service 102 can present a click-through agreement via the interface 402. The electronic signature service 102 can prevent the signatory 302 from accessing or modifying the electronic document 104 without consenting to the click-through agreement.

In additional or alternative embodiments, the modification rule 208 may specify that the signatory 302 is permitted to submit a specified number of proposed changes or iterations of proposed changes. In one example, the modification rule 208 may specify that a specified subset of the fields 106 may be modified by the signatory 302 or that the signatory 302 is limited to a specified number of requests to modify one or more fields 106. The electronic signature service 102 can access the modification rule 208 to identify the number of proposed changes permitted for a signatory 302. The electronic signature service 102 can execute a counter and increment or decrement the counter each time block 708 is performed for a given signatory 302 to a given electronic document 104. The electronic signature service 102 can respond to determining that the signatory 302 has submitted the maximum number of proposed changes by notifying the signatory 302 via the interface 402 (e.g., by displaying a message in the interface 402 that no more proposed changes are permitted, by setting the field 106 to an acceptable value and preventing additional changes to the field 106 from being received via the interface 402, etc.).

The method 700 also involves determining that the updated electronic document 104 is legally binding on the first signatory and the second signatory based on receiving data indicative of the second signatory executing the electronic document 104, as depicted in block 710. One or more processing devices of the electronic signature service 102 can execute suitable program code stored in a non-transitory computer-readable medium to receive data indicative of the signatory 302 executing the electronic document 104. The data can be received in any suitable electronic communication from the signatory 302, as described above with respect to FIG. 5. In some embodiments, the electronic signature service 102 can notify the sender 108 (i.e., the first signatory) that the electronic document 104 has been modified in accordance with the proposed change and that the electronic document 104 has been executed by the signatory 302.

In some embodiments, the method 700 can involve minimizing electronic communications transmitted over a data network that involve with the electronic document 104. For example, one or more of the blocks 702, 704, 706, 708, 710 can be performed by transmitting the electronic communications only to the signatory 302 or (for documents involving multiple signatories) a set of signatories 302 other than the sender 108.

In some embodiments, the method 700 can be used to manage the automatic modification of multiple instances or versions of the electronic document 104 that are provided to multiple signatories (e.g., an electronic agreement provided to hundreds, thousands, or millions of signatories 302 that may involve hundreds, thousands, or millions of transactions between the sender 108 and respective signatories 302). For example, the electronic signature service 102 can generate multiple electronic agreements (e.g., multiple versions of the electronic document 104) that are similar to a given electronic agreement provided by a sender 108. Each of the similar electronic agreements can be between the sender 108 and a respective signatory 302 (or set of signatories 302) from of multiple signatories involved in multiple transactions with the sender 308. For example, multiple versions of a document 104 that includes a sales agreement can be sent to multiple buyers. The metadata 204 can be applicable to each of the electronic agreements. The metadata 204 can be inaccessible to the multiple signatories 302 other than the sender 108 involved in the multiple agreements. In some embodiments, the metadata 302 for the multiple agreements can be stored in a non-transitory computer-readable medium separately from the multiple electronic agreements. The metadata 204 can be altered to reflect different attribute changes that are acceptable to the sender 108 and that are applicable to the multiple electronic agreements. The altered metadata 204 can be used to automatically modify the multiple agreements without resending the various electronic agreements to the multiple signatories. For example, the altered metadata 204 can be used by the electronic signature service 102 to simultaneously or near-simultaneously modify hundreds, thousands, or millions of electronic agreements without transmitting electronic communications involving these agreements to the sender 108.

In additional or alternative embodiments, the electronic signature service 102 may provide one or more auditing functions for documents signed via the electronic signature service 102. For example, the electronic signature service may generate and record audit information that describes how the electronic signature service 102 used the modification rule 208 to verify the acceptability of proposed changes received from a signatory 302 and/or how the electronic signature service 102 used the modification rule 208 to generate acceptable proposals for changes. The electronic signature service 102 may record auditing data in a non-transitory computer-readable medium. Examples of this auditing data include the date on which the metadata 204 was provided, the identity of the individual who provided the metadata 204 to the electronic signature service 102, which modification rules 208 were used to modify one or more attributes of the electronic document 104, etc. In some embodiments, the electronic signature service 102 can provide the audit information to one or more entities identified in the document to be signed (e.g., the parties to a contract).

In some embodiments, one or more reports may be generated for transactions involving electronic documents 104 that are modified using the method 700. For example, the electronic signature service 102 may store records of automatically negotiated contracts and contracts that were not modified prior to execution by a signatory. The electronic signature service 102 may include identifiers in the records of automatically negotiated contracts and other electronic documents 104 that distinguish those contracts and other electronic documents 104 from documents that were executed without modification.

In some embodiments, the electronic signature service 102 may notify the sender 108 of modifications to a given electronic document 104 during a transaction with a given signatory 302. The notifications may be provided via any suitable electronic communication (e.g., presenting a notification in the interface 202, transmitting an e-mail or text message to the sender 108, etc.). The notifications may be provided at any time during or after the performance of the method 700. In some embodiments, the electronic signature service 102 can identify the fields, the proposed values, and the modification rules 208 used to determine the acceptability of proposed changes to the electronic document 104.

In some embodiments, a modification rule 208 may identify one or more circumstances in which additional input from the sender 108 is required. For example, the modification rule 208 may identify one or more acceptable changes to the electronic document 104 that can be implemented without contacting the sender 108, and the modification rule 208 may also identify one or more changes to the electronic document 104 that do not require automatic rejection but that cannot be implemented without contacting the sender 108. The electronic signature service 102 can determine that a proposed change received from a signatory 302 does not require automatic rejection pursuant to a modification rule 208. The electronic signature service 102 can transmit an electronic communication to the sender 108 identifying the proposed change. The electronic signature service 102 can receive data from a computing device associated with the sender 108 that is indicative of either an acceptance or a rejection of the proposed change. The electronic signature service 102 can respond to receiving the data by notifying the signatory 302 of the acceptance or rejection of the proposed change by the sender 108.

Figure 8:
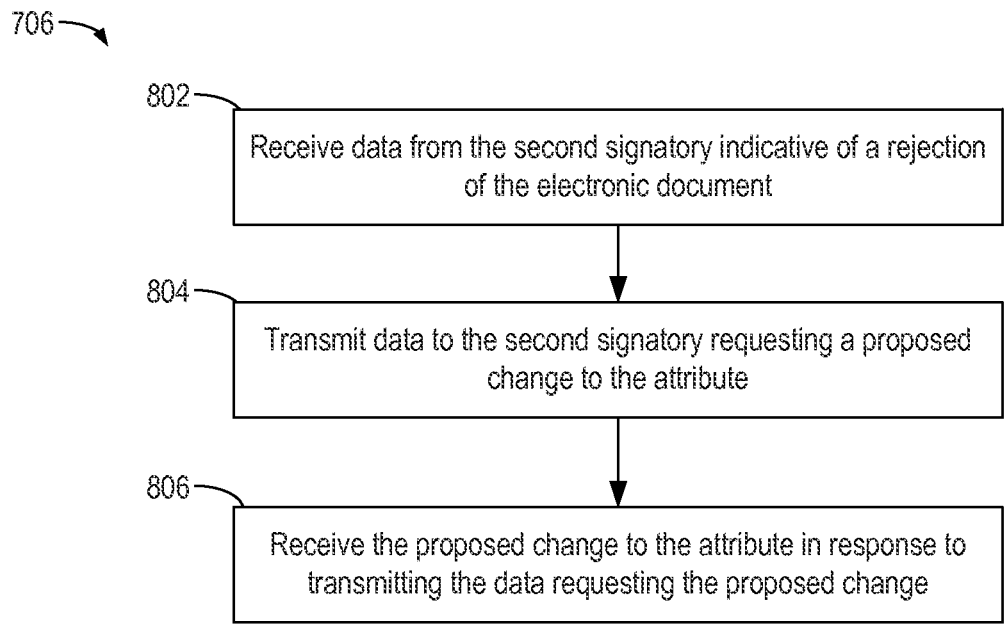
FIG. 8 is a flow chart that depicts an example of a method for obtaining data from a document's signatory that is indicative of a proposed change to an attribute of the document according to certain exemplary embodiments.

Any suitable process can be used for obtaining data from the second signatory indicative of a proposed change to an attribute of the task. For example, FIG. 8 is a flow chart that depicts an example of a method for obtaining data from a document's signatory that is indicative of a proposed change to an attribute of the electronic document 104. For illustrative purposes, the method depicted in FIG. 8 is described as an example of the block 706 of the method 700 and by reference to the exemplary implementation depicted in FIGS. 1-6. Other implementations, however, are possible.

The method depicted in FIG. 8 involves receiving data from the second signatory indicative of a rejection of the electronic document 104, as depicted in block 802. For example, one or more processing devices for the electronic signature service 102 can execute suitable program code stored in a non-transitory computer-readable medium to receive data from the signatory 302 that is indicative of a rejection of the electronic document 104. The data may be received via the interface 402 or any other suitable electronic communication.

The method depicted in FIG. 8 also involves transmitting data to the second signatory requesting a proposed change to the attribute, as depicted in block 804. For example, one or more processing devices for the electronic signature service 102 can execute suitable program code stored in a non-transitory computer-readable medium to transmit data to the signatory 302 requesting the proposed change. The data may be presented via the interface 402 or transmitted via any other suitable electronic communication.

The method depicted in FIG. 8 also involves receiving the proposed change to the attribute in response to transmitting the data requesting the proposed change, as depicted in block 806. For example, one or more processing devices for the electronic signature service 102 can execute suitable program code stored in a non-transitory computer-readable medium to configure a communication device for receiving the proposed change to the attribute. The proposed change to the attribute may be received via the interface 402 or any other suitable electronic communication. The electronic signature service 102 can proceed to block 708 of the method 700 in response to receiving the proposed change at block 806.

Figure 9:
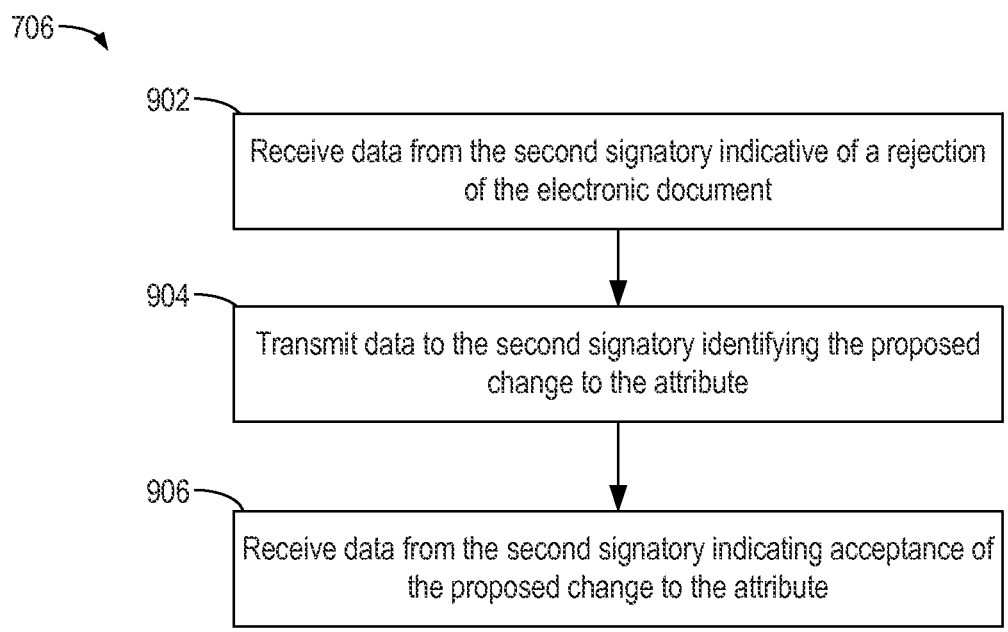
FIG. 9 is a flow chart that depicts an example of an additional method for obtaining data from a document's signatory that is indicative of a proposed change to an attribute of the document according to certain exemplary embodiments.

In some embodiments, the electronic signature service 102 can generate a proposed change to the electronic document 104 based on determining that the signatory 302 has rejected the electronic document 104. For example, FIG. 9 is a flow chart that depicts an example of an additional method for obtaining data from a document's signatory that is indicative of a proposed change to an attribute of the electronic document 104. For illustrative purposes, the method depicted in FIG. 9 is described as an example of the block 706 of the method 700 and by reference to the exemplary implementation depicted in FIGS. 1-6. Other implementations, however, are possible.

The method depicted in FIG. 9 involves receiving data from the second signatory indicative of a rejection of the electronic document 104, as depicted in block 902. For example, one or more processing devices for the electronic signature service 102 can execute suitable program code stored in a non-transitory computer-readable medium to configure a communication device for receiving data from the signatory 302 indicative of a rejection of the electronic document 104. The data may be received via the interface 402 or any other suitable electronic communication.

The method depicted in FIG. 9 also involves transmitting data to the second signatory 302 identifying the proposed change to the attribute, as depicted in block 904. For example, one or more processing devices for the electronic signature service 102 can execute suitable program code stored in a non-transitory computer-readable medium to transmit data to the signatory 302 identifying the proposed change to the attribute. In some embodiments, the electronic signature service 102 can access the modification rule 208 to generate the proposed change without regard to any proposal from the signatory 302. For example, the electronic signature service 102 may change a value of the field 106 based on the modification rule 208 by, for example, incrementing the value as specified by the modification rule 208, calculating a new value based on a formula specified by the modification rule 208, randomly selecting a different acceptable value from a range of acceptable values, etc. In additional or alternative embodiments, the electronic signature service 102 can access the modification rule 208 to generate the proposed change using a different proposed change received from the signatory 302, as described below with respect to FIGS. 10 and 11.

The method depicted in FIG. 9 also involves receiving data from the second signatory 302 indicating acceptance of the proposed change to the attribute, as depicted in block 906. For example, one or more processing devices for the electronic signature service 102 can execute suitable program code stored in a non-transitory computer-readable medium to configure a communication device for receiving data from the signatory 302 that indicates acceptance of the proposed change to the attribute. The data indicating acceptance of the proposed change may be received via the interface 402 or any other suitable electronic communication. The electronic signature service 102 can proceed to block 710 of the method 700 in response to receiving the data indicating acceptance of the proposed change by the signatory 302.

In some embodiments, the implementations of block 706 depicted in FIGS. 8 and 9 can be performed in combination. For example, the electronic signature service 102 can respond to a rejection of the electronic document 104 by performing one or more of the operations depicted in FIG. 8 for soliciting a change to the electronic document 104. The electronic signature service 102 can perform one or more of the operations for determining whether the proposed change obtained in block 806 is acceptable. If the proposed change obtained in block 806 is acceptable, the electronic signature service 102 can proceed with the method 700. If the proposed change obtained in block 806 is not acceptable, the electronic signature service 102 can perform one or more of the operations described above with respect to blocks 904, 906 for providing a proposed change for consideration by the signatory 302.

Figure 10:
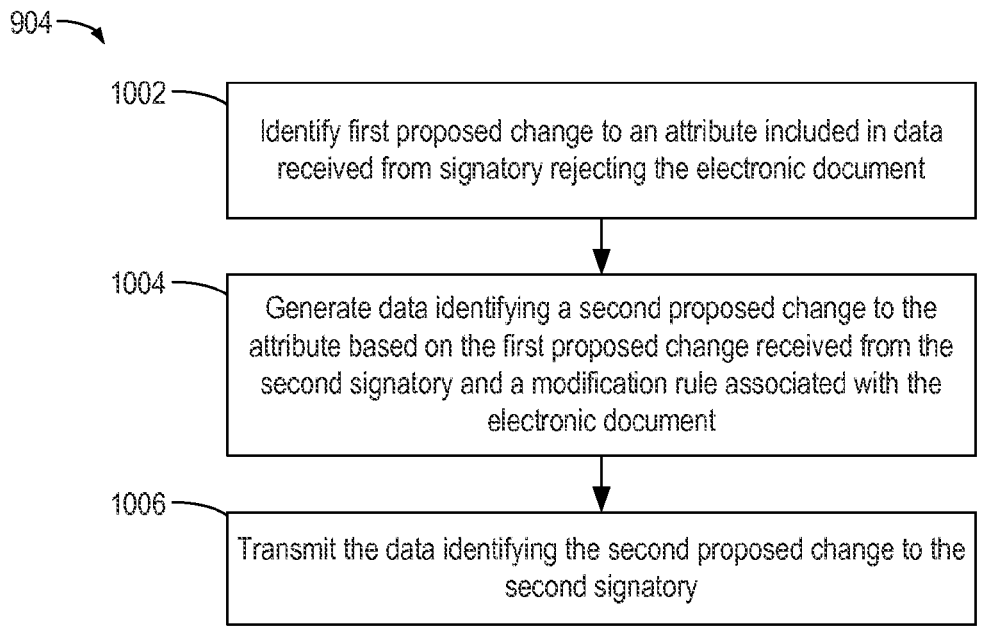
FIG. 10 is a flow chart that depicts an example of a method for suggesting a proposed change to an attribute of the document according to certain exemplary embodiments.

In some embodiments, the electronic signature service 102 can determine, select, identify, or otherwise obtain a proposed change for consideration by the signatory 302 using a different proposed change received from the signatory 302 as an input to a modification rule 208. For example, FIG. 10 is a flow chart that depicts an example of a method for suggesting a proposed change to an attribute of the electronic document 104. For illustrative purposes, the method depicted in FIG. 10 is described as an example of the block 904 depicted in FIG. 9 and by reference to the exemplary implementation depicted in FIGS. 1-6 depicted in FIGS. 1-6. Other implementations, however, are possible.

The method depicted in FIG. 10 can involve identifying a first proposed change to an attribute provided by the second signatory 302 and included in data received from the second signatory 302 that rejects the electronic document 104, as depicted in block 1002. For example, one or more processing devices for the electronic signature service 102 can execute suitable program code stored in a non-transitory computer-readable medium to identify the first proposed change to the attribute.

The method depicted in FIG. 10 can also involve generating data identifying a second proposed change to the attribute based on the first proposed change received from the second signatory 302 and a modification rule 208 associated with the electronic document 104, as depicted in block 1004. For example, one or more processing devices for the electronic signature service 102 can execute suitable program code stored in a non-transitory computer-readable medium to generate data identifying the second proposed change.

In some embodiments, generating data identifying the second proposed change based on the first proposed change can involve determining that the first proposed change is unacceptable and identifying an acceptable proposed change that is different from the initial value 206 and the proposed change from the signatory 302. For example, the electronic signature service 102 can select a value included in the second proposed change from a range of acceptable values, can identify the value included in the second proposed change from a range of acceptable values, or can otherwise determine the value included in the second proposed change based on the modification rule 208 as described above with respect to block 708 in method 700.

In other embodiments, generating data identifying the second proposed change based on the first proposed change can involve determining that the first proposed change is acceptable, but identifying a different acceptable proposed change that is more advantageous to the sender 108. For example, a proposed change from the signatory 302 may be acceptable, but may not maximize or otherwise optimize the transaction value of a transaction involving the electronic document 104. The electronic signature service 102 can select a value included in the second proposed change from a range of acceptable values, can identify the value included in the second proposed change from a range of acceptable values, or can otherwise determine the value included in the second proposed change based on the modification rule 208 as described above with respect to block 708 in method 700.

The method depicted in FIG. 10 can also involve transmitting the data identifying the second proposed change to the second signatory 302, as depicted in block 1006. For example, one or more processing devices for the electronic signature service 102 can execute suitable program code stored in a non-transitory computer-readable medium to configure a communication device for transmitting the data identifying the second proposed change in a manner similar to that described above with respect to FIG. 9.

Figure 11:
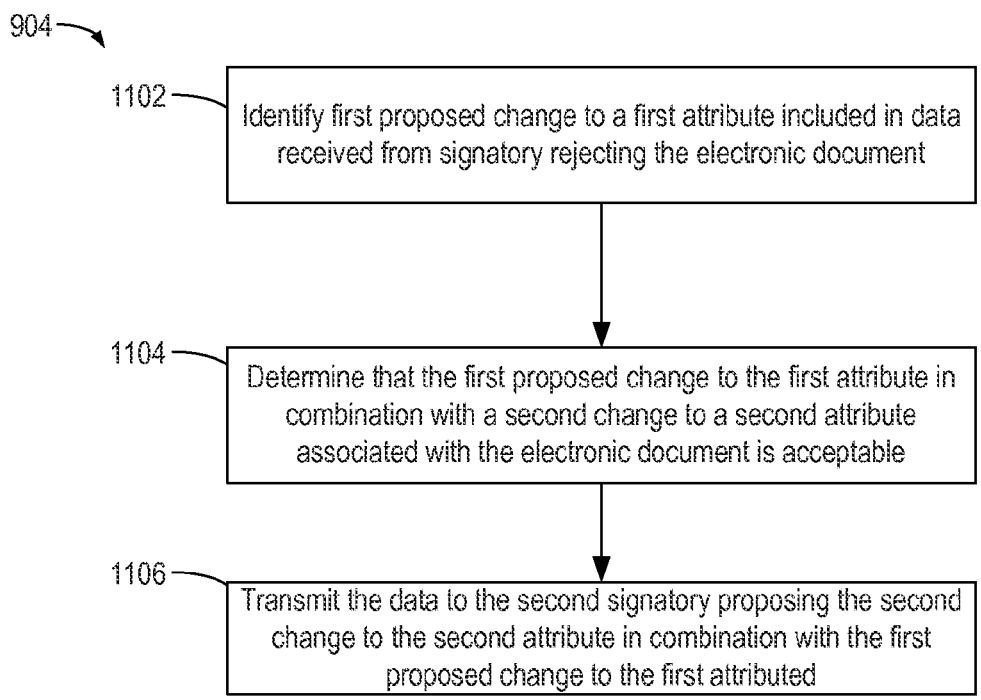
FIG. 11 is a flow chart that depicts an example of an additional method for suggesting a proposed change to an attribute of the document according to certain exemplary embodiments.

In additional or alternative embodiments, the electronic signature service 102 can determine, select, identify, or otherwise obtain a proposed change for consideration by the signatory 302 based on multiple attributes of the electronic document 104. For example, FIG. 11 is a flow chart that depicts an example of an additional method for suggesting a proposed change to an attribute of the electronic document 104. For illustrative purposes, the method depicted in FIG. 10 is described as an example of the block 904 depicted in FIG. 9 and by reference to the exemplary implementation depicted in FIGS. 1-6 depicted in FIGS. 1-6. Other implementations, however, are possible.

The method depicted in FIG. 11 can involve identifying a first proposed change to a first attribute that is included in data received from the signatory rejecting the electronic document 104, as depicted in block 1102. For example, one or more processing devices for the electronic signature service 102 can execute suitable program code stored in a non-transitory computer-readable medium to identify the first proposed change in a manner similar to that described above with respect to block 1002.

The method depicted in FIG. 11 can also involve determining that the first proposed change to the first attribute in combination with a second change to a second attribute associated with the electronic document 104 is acceptable, as depicted in block 1104. For example, one or more processing devices for the electronic signature service 102 can execute suitable program code stored in a non-transitory computer-readable medium to determine that the first proposed change to the first attribute in combination with a second change to a second attribute associated with the electronic document 104 is acceptable.

For example, as described above with respect to block 708, a modification rule 208 specified in the metadata may identify a relationship between multiple fields 106 in the electronic document 104 that are used to determine a transaction value for a transaction involving the electronic document 104. The modification rule 208 may identify a threshold transaction value for the transaction involving the electronic document 104. A set of initial values 206 for a set of fields 106 in the electronic document 104 may provide a transaction value that is greater than or equal to the threshold transaction value. The electronic signature service 102 may determine that the proposed change includes a set of modified values 404 for the fields 106. The electronic signature service 102 may determine that the modified values 404 for the fields 106 provide the same transaction value or a different transaction value that is greater than or equal to the threshold transaction value. The electronic signature service 102 can determine that the modified values 404 are acceptable based determining that the modified values 404 provide a transaction value that is greater than or equal to the threshold transaction value.

The method depicted in FIG. 11 can also involve transmitting the data identifying the second proposed change to the second signatory 302, as depicted in block 1106. For example, one or more processing devices for the electronic signature service 102 can execute suitable program code stored in a non-transitory computer-readable medium to configure a communication device for transmitting the data identifying the second proposed change in a manner similar to that described above with respect to FIG. 9.

Any suitable server or other computing system can be used to implement the electronic signature service 102. For example, FIG. 12 is a block diagram that depicts an example of a server system 1200 for implementing certain embodiments.

The server system 1200 can include a processor 1202 that is communicatively coupled to a memory 1204 and that executes computer-executable program code and/or accesses information stored in the memory 1204. The processor 1202 may comprise a microprocessor, an application-specific integrated circuit ("ASIC"), a state machine, or other processing device. The processor 1202 can include any of a number of processing devices, including one. Such a processor can include or may be in communication with a computer-readable medium storing instructions that, when executed by the processor 1202, cause the processor to perform the operations described herein.

The memory 1204 can include any suitable computer-readable medium. The computer-readable medium can include any electronic, optical, magnetic, or other storage device capable of providing a processor with computer-readable instructions or other program code. Examples of a computer-readable medium include a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The server system 1200 may also comprise a number of external or internal devices such as input or output devices. For example, the server system 1200 is shown with an input/output ("I/O") interface 1208 that can receive input from input devices or provide output to output devices. A bus 1206 can also be included in the server system 1200. The bus 1206 can communicatively couple one or more components of the server system 1200.

The server system 1200 can execute program code for the electronic signature service 102. The program code for the electronic signature service 102 may be resident in any suitable computer-readable medium and execute on any suitable processor. In one embodiment, the program code for the electronic signature service 102 can reside in the memory 1204 at the server system 1200. In another embodiment, the program code for the electronic signature service 102 can be accessed by the server system 1200 from a remote content provider via a data network. The electronic signature service 102 stored in the memory 1204 can configure the processor 1202 to perform the operations described in FIGS. 1-11.

The server system 1200 can also include at least one network interface 1210. The network interface 1210 can include any device or group of devices suitable for establishing a wired or wireless data connection to a data network 1212. Examples of the network interface 1210 include an Ethernet network adapter, a modem, and/or the like.

The server system 1200 can communicate with a computing system 1214 via the data network 1212. A computing system 1214 can include any suitable computing device for executing a client application 1216 configured for accessing the electronic signature service 102 via the data network 1212. Examples of a computing system 1214 include a desktop computer, a tablet computer, a laptop computer, or any other computing device. Examples of a client application 1216 include a web browser application, an e-mail application, a dedicated application for accessing the electronic signature service 102, etc.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method for allowing a second signatory of an electronic agreement to modify the electronic agreement without contacting a first signatory of the electronic agreement or an agent of the first signatory, the method comprising:

providing, by an electronic signature service executed by a computing system and to the second signatory, electronic access to the electronic agreement;

receiving, by the electronic signature service, a first electronic communication from the second signatory indicating that the second signatory has rejected the electronic agreement;

identifying, by the electronic signature service and responsive to receiving the first electronic communication, a proposed change to an attribute of the electronic agreement, the proposed change to the attribute changing a task that at least one of the first signatory and the second signatory will legally be obligated to perform upon execution of the electronic agreement by the second signatory, wherein identifying the proposed change comprises:
  (i) accessing metadata indicative of attribute changes acceptable to the first signatory, wherein the metadata is generated based on input received from the first signatory during a session with the electronic signature service prior to providing access to the electronic agreement by the second signatory, wherein the metadata is associated with the electronic agreement and is inaccessible to the second signatory, and
  (ii) verifying that the proposed change is acceptable based on the metadata indicative of attribute changes acceptable to the first signatory;
updating, by the electronic signature service, the electronic agreement with the proposed change based on verifying that the proposed change is acceptable;
transmitting, by the electronic signature service, the proposed change to the second signatory;
determining, by the electronic signature service, that the second signatory has accepted the electronic agreement based on the electronic signature service receiving a second electronic communication from the second signatory indicating an acceptance of the proposed change by the second signatory; and
determining, by the electronic signature service, that the updated electronic agreement is legally binding on the first signatory and the second signatory based on the electronic signature service receiving, from the second signatory, an indication of the electronic agreement being executed by the second signatory.

2. The method of claim 1, further comprising creating multiple electronic agreements similar to the electronic agreement, wherein each of the multiple similar electronic agreements involves the first signatory and one of multiple signatories, wherein the metadata indicative of attribute changes acceptable to the first signatory is applicable to each of the multiple similar electronic agreements and inaccessible to the multiple signatories.

3. The method of claim 2, further comprising:
storing the metadata separately from the multiple electronic agreements; and
altering the metadata to reflect different attribute changes acceptable to the first signatory and applicable to the multiple electronic agreements, wherein the altered metadata is applicable to the multiple similar agreements without resending the multiple similar electronic agreements to the multiple signatories.

4. The method of claim 1, wherein the metadata indicative of attribute changes acceptable to the first signatory comprises a modification rule specifying at least one of a range of acceptable values associated with the attribute and a threshold of acceptable variation in values in the attribute, wherein verifying that the proposed change is acceptable comprises determining that a value included in the proposed change is within at least one of the range of acceptable values associated and the threshold of acceptable variation in values.

5. The method of claim 1, wherein the metadata indicative of attribute changes acceptable to the first signatory comprises a modification rule specifying a threshold transaction value for a transaction involve the electronic agreement, wherein verifying that the proposed change is acceptable comprises determining that a value associated with the attribute as modified by the proposed change in combination with an additional value associated with an additional attribute of the electronic agreement will result in a transaction value exceeding the threshold transaction value.

6. The method of claim 1, wherein the proposed change is also identified based on an additional proposed change from the second signatory received in the first electronic communication and a modification rule specified in the metadata indicative of attribute changes acceptable to the first signatory.

7. The method of claim 1, further comprising determining, by a processing device, that the first signatory is legally obligated by the electronic agreement upon execution of the electronic agreement by the second signatory, wherein the determination is performed prior to accessing the metadata indicative of attribute changes acceptable to the first signatory, verifying that the proposed change is acceptable, and updating the electronic agreement with the proposed change.

8. The method of claim 1, wherein electronic communications transmitted over a network involving with the electronic agreement are minimized, wherein minimizing the electronic communications comprises transmitting the electronic communications only to the second signatory or a plurality of second signatories rather than the first signatory to perform the operations of accessing the metadata indicative of attribute changes acceptable to the first signatory, verifying that the proposed change is acceptable, and updating the electronic agreement with the proposed change.

9. A system for allowing a second signatory of an electronic agreement to modify the electronic agreement without contacting a first signatory of the electronic agreement or an agent of the first signatory comprising:
  a processing device; and
  a non-transitory computer-readable medium communicatively coupled to the processing device, wherein the processing device is configured for executing program code of an electronic signature service stored in the non-transitory computer-readable medium to perform, with the electronic signature service, operations comprising:
    providing, to the second signatory, electronic access to the electronic agreement,
    receiving a first electronic communication from the second signatory indicating that the second signatory has rejected the electronic agreement,
    identifying, responsive to receiving the first electronic communication, a proposed change to an attribute of the electronic agreement, the proposed change to the attribute changing a task that at least one of the first signatory and the second signatory will legally be obligated to perform upon execution of the electronic agreement by the second signatory, wherein identifying the proposed change comprises:
      (i) accessing metadata indicative of attribute changes acceptable to the first signatory, wherein the metadata is generated based on input received from the first signatory during a session with the electronic signature service prior to providing access to the electronic agreement by the second signatory, wherein the metadata is associated with the electronic agreement and is inaccessible to the second signatory, and (ii) verifying that the proposed change is acceptable based on the metadata indicative of attribute changes acceptable to the first signatory, updating the electronic agreement with the proposed change based on verifying that the proposed change is acceptable, transmitting the proposed change to the second signatory, determining that the second signatory has accepted the electronic agreement based on the electronic signature service receiving a second electronic communication from the second signatory indicating an acceptance of the proposed change by the second signatory, and determining that the updated electronic agreement is legally binding on the first signatory and the second signatory based on the electronic signature service receiving, from the second signatory, an indication of the electronic agreement being executed by the second signatory.

10. The system of claim 9, wherein the processing device is further configured for:

creating multiple electronic agreements similar to the electronic agreement, wherein each of the multiple similar electronic agreements involves the first signatory and one of multiple signatories, wherein the metadata indicative of attribute changes acceptable to the first signatory is applicable to each of the multiple similar electronic agreements and inaccessible to the multiple signatories;

storing the metadata separately from the multiple electronic agreements; and altering the metadata to reflect different attribute changes acceptable to the first signatory and applicable to the multiple electronic agreements, wherein the altered metadata is applicable to the multiple similar agreements without resending the multiple similar electronic agreements to the multiple signatories.

11. The system of claim 9, wherein the metadata indicative of attribute changes acceptable to the first signatory comprises a modification rule specifying at least one of a range of acceptable values associated with the attribute and a threshold of acceptable variation in values in the attribute, wherein verifying that the proposed change is acceptable comprises determining that a value included in the proposed change is within at least one of the range of acceptable values associated and the threshold of acceptable variation in values.

12. The system of claim 9, wherein the metadata indicative of attribute changes acceptable to the first signatory comprises a modification rule specifying a threshold transaction value for a transaction involve the electronic agreement, wherein verifying that the proposed change is acceptable comprises determining that a value associated with the attribute as modified by the proposed change in combination with an additional value associated with an additional attribute of the electronic agreement will result in a transaction value exceeding the threshold transaction value.

13. The system of claim 9, wherein the proposed change is also identified based on an additional proposed change from the second signatory received in the first electronic communication and a modification rule specified in the metadata indicative of attribute changes acceptable to the first signatory.

14. The system of claim 9, wherein the processing device is further configured for determining that the first signatory is legally obligated by the electronic agreement upon execution of the electronic agreement by the second signatory, wherein the determination is performed prior to accessing the metadata indicative of attribute changes acceptable to the first signatory, verifying that the proposed change is acceptable, and updating the electronic agreement with the proposed change.

15. A non-transitory computer-readable medium having program code of an electronic signature service executable by a processing device stored thereon, the electronic signature service allowing a second signatory of an electronic agreement to modify the electronic agreement without contacting a first signatory of the electronic agreement or an agent of the first signatory, the program code comprising:

program code for providing, via the electronic signature service and to the second signatory, electronic access to the electronic agreement by the second signatory;

program code for receiving, by the electronic signature service, a first electronic communication from the second signatory indicating that the second signatory has rejected the electronic agreement;

program code for identifying, by the electronic signature service and responsive to receiving the first electronic communication, a proposed change to an attribute of the electronic agreement, the proposed change to the attribute changing a task that at least one of the first signatory and the second signatory will legally be obligated to perform upon execution of the electronic agreement by the second signatory, wherein identifying the proposed change comprises:

(i) accessing metadata indicative of attribute changes acceptable to the first signatory, wherein the metadata is generated based on input received from the first signatory during a session with the electronic signature service prior to providing access to the electronic agreement by the second signatory, wherein the metadata is associated with the electronic agreement and is inaccessible to the second signatory, and (ii) verifying that the proposed change is acceptable based on the metadata indicative of attribute changes acceptable to the first signatory;

program code for updating, by the electronic signature service, the electronic agreement with the proposed change based on verifying that the proposed change is acceptable;

program code for transmitting, by the electronic signature service the proposed change to the second signatory;

program code for determining, by the electronic signature service, that the second signatory has accepted the electronic agreement based on the electronic signature service receiving a second electronic communication from the second signatory indicating an acceptance of the proposed change by the second signatory and program code for determining, by the electronic signature service, that the updated electronic agreement is legally binding on the first signatory and the second signatory based on the electronic signature service receiving, from the second signatory, an indication of the electronic agreement being executed by the second signatory.

16. The non-transitory computer-readable medium of claim 15, wherein the metadata indicative of attribute changes acceptable to the first signatory comprises a modification rule specifying a threshold transaction value for a transaction involve the electronic agreement, wherein verifying that the proposed change is acceptable comprises determining that a value associated with the attribute as modified by the proposed change in combination with an additional value associated with an additional attribute of the electronic agreement will result in a transaction value exceeding the threshold transaction value.

17. The non-transitory computer-readable medium of claim 15, wherein the proposed change is also identified based on an additional proposed change from the second signatory received in the first electronic communication and a modification rule specified in the metadata indicative of attribute changes acceptable to the first signatory.

18. The non-transitory computer-readable medium of claim 15, wherein the metadata indicative of attribute changes acceptable to the first signatory comprises a modification rule specifying at least one of a range of acceptable values associated with the attribute and a threshold of acceptable variation in values in the attribute, wherein the program code for verifying that the proposed change is acceptable comprises program code for determining that a value included in the proposed change is within at least one of the range of acceptable values associated and the threshold of acceptable variation in values.

19. The non-transitory computer-readable medium of claim 15, further comprising program code for creating multiple electronic agreements similar to the electronic agreement, wherein each of the multiple similar electronic agreements involves the first signatory and one of multiple signatories, wherein the metadata indicative of attribute changes acceptable to the first signatory is applicable to each of the multiple similar electronic agreements and inaccessible to the multiple signatories.

20. The non-transitory computer-readable medium of claim 19, the program code further comprising:
   program code for storing the metadata separately from the multiple electronic agreements; and
   program code for altering the metadata to reflect different attribute changes acceptable to the first signatory and applicable to the multiple electronic agreements, wherein the altered metadata is applicable to the multiple similar agreements without resending the multiple similar electronic agreements to the multiple signatories.

* * * * *